United States Patent [19]
Kleinschuster

[11] 3,991,014
[45] Nov. 9, 1976

[54] POLYESTERS OF DERIVATIVES OF HYDROQUINONE AND BIS(CARBOXYPHENYL)ETHER

[75] Inventor: Jacob John Kleinschuster, Wilmington, Del.

[73] Assignee: E. I. Du Pont de Nemours and Company, Wilmington, Del.

[22] Filed: July 16, 1975

[21] Appl. No.: 596,236

Related U.S. Application Data

[63] Continuation-in-part of Ser. No. 468,690, May 10, 1974, abandoned.

[30] Foreign Application Priority Data

Apr. 29, 1975 Sweden .............................. 7504996

[52] U.S. Cl. .......................... 260/47 C; 57/140 R; 260/31.2 XA; 260/32.8 R; 260/33.8 R; 260/61; 264/205; 264/290 R

[51] Int. Cl.² .................. C08G 63/18; C08G 63/66

[58] Field of Search ............................ 260/47 C, 61

[56] References Cited
UNITED STATES PATENTS

| | | | |
|---|---|---|---|
| 3,160,603 | 12/1964 | Holub et al. ........................... | 260/47 |
| 3,160,605 | 12/1964 | Kastor et al. ......................... | 260/47 |
| 3,225,003 | 12/1965 | Macon .................................. | 260/47 |
| 3,704,279 | 11/1972 | Ismail................................... | 260/61 |
| 3,780,148 | 12/1973 | Jackson, Jr. et al. ................. | 264/41 |

*Primary Examiner*—Lester L. Lee

[57] ABSTRACT

This invention relates to a class of novel polyesters derived from derivatives of hydroquinone and bis(carboxyphenyl)ether and to the fibers and other shaped articles prepared therefrom. Also comprehended by this invention are the novel, optically anisotropic polyester melts from which these shaped articles can be prepared.

12 Claims, 1 Drawing Figure

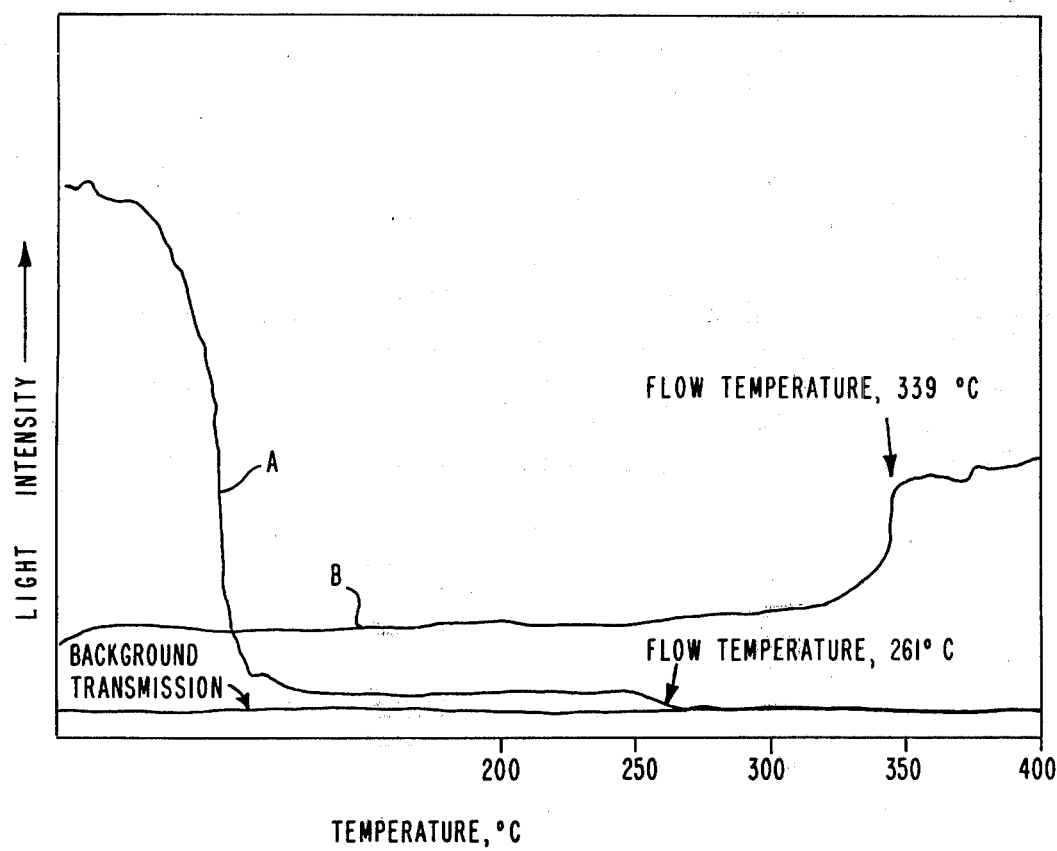

POLYESTERS OF DERIVATIVES OF HYDROQUINONE AND BIS(CARBOXYPHENYL)ETHER

CROSS REFERENCE TO RELATED APPLICATION

This application is a continuation-in-part of my application Ser. No. 468,690, filed May 10, 1974 and now abandoned.

BACKGROUND OF THE INVENTION

While numerous other polyesters have been prepared and evaluated, polyethylene terephthalate continues to be the singularly preferred polyester in current commercial use. This species is used to prepare a variety of products including films, textile filaments, tire cords, ropes, and other industrial and consumer products. The development of new polyesters having certain advantages over polyethylene terephthalate has been a worthwhile objective.

SUMMARY OF THE INVENTION

This invention provides novel, anisotropic-melt-forming polyesters of fiber-forming molecular weight consisting essentially of units of the formula:

   I and

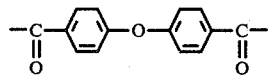   II wherein A is selected from the group of chloro-, bromo-, methyl-, and dimethyl-1,4-phenylene radicals; up to 20 mol % of formula I units may be replaced with —O—X—O— units where X is selected from the group of 1,4-phenylene, dichloro-1,4-phenylene, ethyl-1,4-phenylene, tertiary butyl-1,4-phenylene, 4,4'-biphenylene, oxybis(1,4-phenylene), thiobis-(1,4-phenylene), 3,3',5,5'-tetramethyl-4,4'-biphenylene and 3,3',5,5'-tetrachloro-4,4'-biphenylene and up to 20 mol % of formula II units may be replaced with

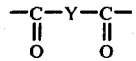

units where Y is selected from the group of 1,3-phenylene, 1,4-phenylene, chloro-1,4-phenylene, bromo-1,4-phenylene, methyl-1,4-phenylene, 1,4-cyclohexylene, 2,6-naphthylene, 4,4'-biphenylene, and ethylenedioxybis(1,4-phenylene) with the proviso that no more than 10 mol % based on the total of formula I, formula II, —O—X—O— and

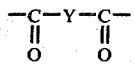

units are replaced. Formula I units and their replacements and formula II units and their replacements are present in essentially equimolar amounts.

Also comprehended by this invention are optically anisotropic melts, novel shaped articles of the polyesters and methods for preparing such shaped articles. Especially preferred are high strength fibers which are characterized by a desirable combination of properties including hydrolytic stability, resistance to high temperatures, and in-rubber stability. These fibers are characterized by high as-spun orientation, low shrinkage, and high modulus retention at elevated temperatures, e.g., 150° C. Heat-treating processes of a defined nature enhance the properties of certain fibers of this invention resulting in fibers of tenacities in excess of 10 gpd and moduli exceeding 200 gpd.

DRAWING

The FIGURE depicts light intensity traces obtained as described herein for two different polyesters in the solid and melt states along with the background trace. One of the trace curves is of a polyester yielding an anisotropic melt while the other trace curve is of a polymer which yields an isotropic melt.

DESCRIPTION OF THE PREFERRED EMBODIMENT

Polyesters

The novel polyesters of this invention may be prepared from appropriate dicarboxylic acids and dihydric phenols or their derivatives.

Useful Monomers

Dihydric phenols which may be used for preparing the polyesters of this invention include 2-chloro-, 2-bromo-, 2-methyl and 2,6-dimethylhydroquinone. Optionally, up to 20 mol % of these hydroquinones may be replaced with hydroquinone, ethyl-, tertiary butyl-, and dichlorohydroquinone, 4,4'-dihydroxydiphenyl, oxy-4,4'-diphenol, thio-4,4'-diphenol, 3,3',5,5'-tetramethyl-4,4'-dihydroxydiphenyl or 3,3',5,5'-tetrachloro-4,4'-dihydroxydiphenyl. Phenolic reactants are used preferably in the derivative form such as the corresponding diacetates.

The polyesters can be prepared by melt polymerization techniques wherein the phenolic reactants are caused to react with bis(4-carboxyphenyl) ether at elevated temperatures. Up to 20 mol % of the bis(4-carboxyphenyl) ether may be replaced with 2,6-naphthalic acid, hexahydroterephthalic acid, terephthalic acid and the chloro-, bromo- and methyl- derivatives thereof, 4,4'-bibenzoic acid, ethylene dioxy-4,4'-dibenzoic acid or isophthalic acid.

The preferred polyester according to this invention is poly(chloro-1,4-phenylene 4,4'-oxydibenzoate). Other useful polyesters according to this invention include copoly(chloro-1,4-phenylene 4,4'-oxydibenzoate/-terephthalate) (95/5 to 80/20 mol basis), copoly(-chloro-1,4-phenylene/4,4'-biphenylene 4,4'-oxydibenzoate/4,4'-bibenzoate) (90/10–90/10), copoly(chloro-1,4-phenylene/-2,5-dichloro-1,4-phenylene 4,4'-oxydibenzoate/2,6-naphthalate) (90/10–90/10), copoly(1,4-phenylene/chloro-1,4-phenylene 4,4'-oxydibenzoate/ethylenedioxy-4,4'-dibenzoate) (10/90–90/10), and copoly(chloro-1,4-phenylene/3,3',5,5'-tetramethyl-4,4'-biphenylene 4,4'-oxydibenzoate)(80/20).

Polymerization Conditions

The polyesters and copolyesters may be prepared from appropriate monomers by melt polymerization techniques, preferably under anhydrous conditions in an inert atmosphere. For example, equimolar amounts of the reactant acid and the diacetate of the dihydric phenol are combined in a reaction vessel equipped with a stirrer, nitrogen inlet tube, and combined distillation head-condenser (to facilitate by-product removal). The reaction vessel and other equipment are dried and purged with nitrogen prior to use. The vessel and stirred contents, maintained under nitrogen, are heated during which time the reactants polymerize and the by-product (acetic acid) is removed via the distillation head-condenser and is collected. When the polymerization appears nearly complete, as indicated by the amount of acetic acid collected remaining constant, the molten polymer mass is placed under reduced pressure (e.g., 1 mm. Hg or less) and is heated, under nitrogen, at a higher temperature to facilitate removal of the remaining acetic acid and to complete the polymerization. The melt may then be removed, cooled, and allowed to solidify prior to purification and/or subsequent processing. Optionally, the molten polymer may be transferred directly to an appropriate apparatus for preparation of shaped articles, e.g., a fiber spinning unit.

For smaller scale syntheses, e.g., in a polymer melt tube, agitation may be accomplished by passing a stream of inert gas through the melt. However, mechanical stirring is preferred.

Polymerization conditions may be varied according to, e.g., the reactants employed, and the degree of polymerization desired.

Anisotropic Melts

The anisotropy of these polyesters and copolyesters in the molten state facilitates attainment of high orientation, high strength, high initial modulus, and/or low shrinkage in fibers prepared from the melts, and contributes to the capacity of these fibers to increase in tenacity on heat treatment in an essentially relaxed state.

Optical anisotropy of the polyester melts can be determined by modification of known procedures. It is well known that translucent optically anisotropic materials cause light to be transmitted in optical systems equipped with crossed polarizers [see, e.g., S. A. Jabarin and R. S. Stein, J. Phys. Chem. 77, 399 (1973)], whereas transmission of light is theoretically zero for isotropic materials. Thus, optical anisotropy can be determined by placing a sample of the polymer on a heating stage of a polarizing microscope and bringing the temperature up to and beyond the polymer flow temperature. If the polymer is optically anisotropic in the melt, a bright field will be observed at temperatures above the polymer flow temperature. This may be confirmed through use of the thermo-optical test (TOT) described below. The apparatus is similar to that described by I. Kirshenbaum, R. B. Isaacson, and W. C. Feist, Polymer Letters, 2, 897–901 (1964).

Shaped Article Preparation

The polyesters of this invention are formed into useful shaped articles such as fibers, films, bars, or other molded objects, etc. by, e.g., pressing or by spinning, casting, or extruding the anisotropic melts thereof. Especially preferred are the highly oriented, strong fibers. For fiber preparation the molten polymer mass, obtained either directly from the melt polymerization of the polymer-forming ingredients or via the melting of a plug or block of polymer, is processed, e.g., through a melt spinning unit and extruded through a spinneret into a quenching atmosphere (e.g., air maintained at room temperature) and wound up. As used herein, the term "as-spun fiber" refers to a fiber which has not been drawn, stretched, or heat treated after extrusion and normal windup. In fact, the "as-spun" fibers of the anisotropic melts cannot be drawn in the usual sense, i.e., 100% or more.

Fibers may be prepared conveniently from single or multi-hole spinnerets. In the melt spinning cell, the melt zone temperature will be in the range of, e.g., from about 300° to 350° C, depending on the sample. Higher temperatures are used for samples exhibiting higher inherent viscosities or higher flow temperatures. Temperatures preferably are maintained above the flow temperature but, under pressure, fibers can be spun somewhat below the flow temperature since the latter is measured at essentially zero shear. Similarly, spinneret temperatures will be in the range of, e.g., from about 300° to 375° C depending on the melt zone temperature and the (co)polymer system. As shown in the examples, filtering screens may be employed in the spinneret pack. Air is preferred as a quenching medium for the fibers leaving the spinneret. The as-spun fibers may be wound up at speeds in the range of, e.g., from less than 100 yd/min to 1,750 yd/min or higher. The spin stretch factor selected (SSF, defined hereinafter) will depend on spinneret hole size and may range from 5 to 400. If desired, a finish may be applied to the as-spun fibers.

For small quantities of material, a convenient method for demonstrating fiber-forming potential of these compositions is to melt a chip of polymer in the anisotropic melt-forming temperature range on a heated bar (e.g., a modified Dennis bar, see Sorenson, W. and Campbell, T. W. "Preparative Methods of Polymer Chemistry", Interscience Publishers, Inc., New York, 1961, p. 49–50), and slowly (~1 ft/sec) withdraw fibers from the melted pool. Such fibers usually are highly oriented and strong in contrast to fibers made from poly(ethylene terephthalate), a known melt spinnable polyester, by the same method.

Films may be prepared by conventional melt-pressing techniques. Exceptionally tough bars may be prepared by injection molding. The relatively low viscosity of the melts is an advantage in processing.

It is preferred that the polyesters have a flow temperature within the range of 200° to 375° C. Polyesters with flow temperatures in excess of 375° C are difficult to process (e.g., spin into useful fibers). Depending on structure, rapid decomposition of the polyesters may occur at higher temperatures, i.e., above 375° C.

Plasticizers may be used to assist in the formation of shaped articles from those polyesters which exhibit high melting point and/or high values of inherent viscosity.

Fibers, Films, Bars: Properties, Heat Treatment, Utility

As-spun poly(chloro-1,4-phenylene 4,4'-oxydibenzoate) fiber of this invention can be obtained with a tenacity within the range of from about 1–5 gpd, an initial modulus in excess of 100 gpd, and an X-ray orientation angle of less than about 35°. A bar of the same composition (insoluble in sym-dichlorotetrafluoroacetone hydrate), injection molded at 320° C, exhibits an average flexural modulus of 542,000 lb/in$^2$, a flexural strength of 19,000 lb/in$^2$ (ASTM-D-790, Method 1, Proc. A) and notched Izod impact strength (ASTM-D-256, Method A) of 10.8 ft-lb/inch of notch.

The as-spun fibers of this invention may be subjected to heat treatment processes which provide fibers characterized by, e.g., higher levels of tensile properties. For example, a heat treated poly(chloro-1,4-phenylene 4,4'-oxydibenzoate) fiber ordinarily exhibits a tenacity of at least about 10 grams per denier. At 150° C such fibers retain over one-half of their room temperature tenacity and modulus. They also have good hydrolytic stability and retain most of their strength in high amine rubber stock at elevated temperatures.

The foregoing properties favor the use of the fibers of this invention in, e.g., belts of automobile tires, towing ropes, plastic reinforcement, knitted and woven fabrics, and other applications wherein a combination of high strength, low extensibility, low density, high initial modulus, and low shrinkage are required, e.g., in the preparation of ropes, hawsers, and cordage for marine usage as noted in U.S. Pat. No. 3,400,194.

In the heat-treating process fiber samples as skeins or on bobbins may be heated in an inert atmosphere (e.g., nitrogen) under a variety of conditions. Heating is normally conducted for from 30 minutes to 4 hours at a temperature approaching the fusion point but sufficiently below to prevent substantial interfilament fusion, i.e., yarns are rewindable. It is preferred that the maximum temperature be reached in a stepwise fashion.

When the fiber samples are wound on bobbins, it is preferred that a soft, yielding surface be present on the bobbin, e.g., a covering of Fiberfrax (batted ceramic insulation of the Carborundum Company). The inert atmosphere within the oven or other heat-treating chamber is changed during the treating period by causing a flow of the inert gas (e.g., nitrogen) to enter and to leave the oven at a rate sufficient to remove by-products from the vicinity of the fiber.

MEASUREMENTS AND TESTS

X-Ray Orientation Angle: The orientation angle (O.A.) values reported herein are obtained by the procedures described in Kwolek U.S. Pat. No. 3,671,542, using Method Two of that patent. For fibers of this invention, the arc used for orientation angle determination occurs at about 20° for 2θ. In the examples a specific 2θ value is shown parenthetically after the O.A. value.

Inherent Viscosity: Inherent viscosity ($\eta$inh) is defined by the following equation:

$$\eta\text{inh} = \frac{\ln(\eta\text{rel})}{C}$$

wherein ($\eta$rel) represents the relative viscosity and $C$ represents a concentration of 0.5 gram of the polymer in 100 ml. of solvent. The relative viscosity ($\eta$rel) is determined by dividing the flow time in a capillary viscometer of a dilute solution of the polymer by the flow time for the pure solvent. The dilute solutions used herein for determining ($\eta$rel) are of the concentration expressed by ($C$), above; flow times are determined at 30° C.; the solvent is sym-dichlorotetrafluoroacetone hydrate.

Fiber Tensile Properties: Filament and yarn properties are measured by the procedures shown in Morgan U.S. Pat. No. 3,827,998. Tenacity, T, and Modulus, Mi, are given in grams per denier. Elongation, E, is given in percent. At least three breaks are averaged.

It should be noted that different values are obtained from single filaments (filament properties) and from multifilament strands (yarn properties) of the same sample. Unless specified otherwise all properties given herein are filament properties.

Optical Anisotropy: Optical Anisotropy may be measured by the method shown herein.

Spin Stretch Factor: The spin stretch factor is defined as follows:

$$\text{S.S.F.} = \frac{\text{Velocity of yarn at wind-up (ft./min.)}}{\text{Velocity of melt through spinneret (ft./min.)}}$$

where $$\text{Vel. of melt through spinneret} = \frac{\text{Rate of extrusion (cu. ft./min.)}}{\text{No. of spinneret holes} \times \text{cross-sectional area of one hole (sq. ft.)}}$$

TOT AND FLOW TEMPERATURE APPARATUS AND METHOD

The thermo-optical test (TOT) requires a polarizing microscope which should have strain-free optics and sufficiently high extinction with crossed (90°) polarizers to be capable of giving a background transmission specified below. A Leitz Dialux-Pol microscope was used for the determinations reported herein. It was equipped with Polaroid polarizers, binocular eyepieces, and a heating stage. A photodetector (a photometer sensor) was attached at the top of the microscope barrel. The microscope had a 32X, long working distance objective, and a Red I plate (used only when making visual observations with crossed polarizers; inserted at an angle of 45° to each polarizer). White light from an incandescent light source is directed through the polarizer, through the sample on the heating stage and through the analyzer to either the photodetector or the eyepieces. A slide permits transferring the image from eyepieces to photodetector. The heating stage used is one capable of being heated to 500° C. A "Unitron" model MHS vacuum heating stage (Unitron Instrument Co., 66 Needham St., Newton Highlands, Massachusetts 02161) was used. The photodetector signal is amplified by a photometer amplifier and fed to the Y-axis of an X–Y recorder. The system response to light intensity should be linear and the error of measurement within ± 1 mm. on the chart paper. The heating stage is provided with two attached thermocouples. One is connected to the X-axis of the X–Y recorder to record stage temperature, the other to a programmed temperature controller.

The microscope is focused visually (with crossed polarizers) on a polymer sample prepared and mounted as described below. The sample, but not the cover slip(s), is removed from the optical path. The Polaroid analyzer of the microscope is removed from the optical path, the slide is shifted to transfer the image to the photodetector and the system is adjusted so that full-scale deflection (18 cm. on the chart paper used) on the Y-axis of the X–Y recorder corresponds to 36% of the photometer signal. This is done by (1) adjusting the light source intensity so that the photometer meter reads a value preselected so that it corresponds to a Y-axis reading on the recorder of 5 cm; (2) increasing the amplification of the photometer by a factor of 10.

This results in the full scale recorder deflection of 18 cm corresponding to (18/50) × 100 or 36% of the photometer signal. The background transmission value is recorded with crossed (90°) polarizers and with the cover slip(s), but not the sample, in the optical path. The background transmission in the system used should be independent of temperature and should be less than about 0.5 cm. on the chart paper.

The sample is preferably a 5 μm. section microtomed with a diamond knife from a solid well-coalesced chip of pure polymer (e.g., as prepared in the examples, or by melting and coalescing under nitrogen some of the ground polymer) mounted in epoxy resin. For materials that shatter when microtomed, duplicate films (about 5 μm. thick) of polymer are prepared by heating a few particles of pure polymer between each of two sets of cover slips enclosed between a pair of microscope slides. By heating this assembly quickly above the flow temperature (independently determined on a polymer particle) and applying pressure with a wooden tamp alternately over each sample, thin liquid films of polymer are produced. These films solidify when cooled. One solid film between cover slips is used for the TOT procedure; the other is used for a flow temperature measurement.

The sample section is pressed flat between cover slips. One cover slip is removed and the sample on the remaining cover slip is placed (glass down) on the heating stage. The light intensity is set and the background transmission is measured as described above. The sample (section, or film between cover slips) then is positioned so that essentially all the light intercepted by the photodetector will pass through the sample. With the sample between crossed (90°) polarizers and under nitrogen, the light intensity and temperature are recorded on the X–Y recorder as the temperature is raised at a programmed rate of about 14° C/min. from 25° to 450° C. The sample temperature is obtained from the recorded temperature by use of a suitable calibration curve.

The flow temperature of polymers or fibers is observed visually between crossed (90°) polarizers on the heating stage assembly previously described for the TOT procedure. Fiber samples for examination are prepared by cutting the fiber with a razor blade and mounting the samples on a cover slip. Flow temperature is that temperature at which the sharp edges of a tiny chip or particle of polymer or the cut fiber edge become rounded. If the melt viscosity is low enough, flow is observed. When a film is used in the TOT procedure, a duplicate film is used for the flow temperature determination. Flow temperature is that temperature at which the film edges change contour or the polymer flows. Observations usually are made at a heating rate of 14° C/min. In a few cases, where rapid further polymerization occurs, a faster rate, about 50° C/min, is recommended.

It should be understood that the flow temperature of these polymers or fibers thereof may vary depending on their history. For example, stepwise heating ordinarily raises the flow temperature. This permits heat treatment at temperatures above the initial flow temperature but below the newly attained flow temperature level. The reported flow temperatures are those determined by these procedures.

Intensity Traces

The melt-forming polymers useful for fibers in this invention are considered to form anisotropic melts according to the thermooptical test (TOT) if, as a sample is heated between crossed (90°) polarizers to temperatures above its flow temperature, the intensity of the light transmitted through the resulting anisotropic melt gives a trace whose height (1) is at least twice the height of the background transmission trace on the recorder chart and is at least 0.5 cm greater than the background transmission trace, or (2) increases to such values. Curve B of the Figure illustrates a type of intensity trace usually obtained for systems forming anisotropic melts.

The intensity of light transmitted through the analyzer when isotropic melts (the sample should be completely melted) are placed between crossed (90°) polarizers is essentially that of the background transmission (that obtained when the sample but not the cover slip is outside the field of view with 90° crossed polarizers). As the melt forms, the intensity of the light transmission (1) is essentially that of the background transmission or (2) decreases to such values from a higher value. Curve A of the FIGURE illustrates an intensity trace of a polymer forming an isotropic melt.

EXAMPLE 1

This example illustrates the preparation of poly(-chloro-1,4-phenylene 4,4'-oxydibenzoate) from which high strength fibers are prepared.

In a 500 ml. resin kettle equipped with a stirrer, distillation column and takeoff arm, and nitrogen inlet port are placed chlorohydroquinone diacetate (46.2 g., 0.20 mole) and bis(4-carboxyphenyl)ether (51.7 g., 0.20 mole). These ingredients, under nitrogen, are heated and stirred between 289°–318° C. for 1 hour; the byproduct acetic acid is removed. The nitrogen flow is halted and the reaction mixture is heated at about 321° C. for 7 minutes under a reduced pressure within 200–130 mm. Hg. There is obtained 70.0 g. of polymer, $\eta$inh = 0.56. The polymer flows at 339° C and exhibits optical anisotropy above this temperature. A melt spun fiber of this polymer exhibits these yarn properties T/E/Mi/Den. = 3.3/3.8/152/80; O.A. = 26° (20°).

A portion of this yarn is heated in an insulated oven, swept with a stream of nitrogen (3.2 scfm.), for 1 hour under each of the following temperature conditions: room temperature — 172° C., 172°–201° C., 201°–250° C., 250°–274° C., after which the yarn is permitted to cool to room temperature (RT). The sample is then heated through the range of RT-292° C. over 1.5 hour, then allowed to cool to RT. The yarn is heated through the range of RT-315° C. during 1.4 hours, then cooled to RT. After these treatments, yarn T/E/Mi/Den. = 13.3/3.4/291/105.

EXAMPLE 2

This example illustrates the preparation of poly (methyl-1,4-phenylene 4,4'-oxydibenzoate) from which are prepared strong fibers.

In a 250 ml. 3-necked flask equipped essentially as described in Example 1 are placed methylhydroquinone diacetate (10.4 g., 0.05 mole) and bis(4-carboxyphenyl)ether (12.9 g., 0.05 mole). These reactants, under argon, are heated and stirred at 265°–310° C. for 62 minutes; the by-product acetic acid is removed. The argon flow is halted and the reaction mixture is heated at 310° C for 5 minutes under a reduced pressure of about 3 mm Hg. The product is cooled under vacuum, then polymerized further at 275° C via solid phase polymeriation to give a polymer with ηinh = 0.57. The polymer flows at 346° C and exhibits optical anisotropy above this temperature (TOT).

A sample of this polymer (ηinh = 0.57) is extruded into air through a 1-hole spinneret (hole diameter = 0.023 cm; melt zone temperature is within range of 326°-338° C.; spinneret temperature varies between 318°-328° C.) and wound up within the range of 549-837 m./min. An as-spun filament exhibits T/E/Mi/Den. = 2.9/5.7/101/4.8; O.A. = 35° (18.9°).

Another sample of the as-spun fiber is wound on a small bobbin wrapped with Fiberfrax (batted ceramic insulation of the Carborundum Co.) and is heated, under nitrogen flow, in a small muffle furnace under these successive conditions: ½ hr./283° C., 1 hr./300° C., and ¾ hr./310° C. The fiber thus obtained exhibits T/E/Mi/Den.: 9.8/4.5/169/4.3.

EXAMPLE 3

This example illustrates the preparation of copoly(-chloro-1,4-phenylene/4,4'-oxydiphenylene 4,4'-oxydibenzoate) (90/10) from which are prepared fibers with high strength and high elongation.

In a reaction vessel are placed chlorohydroquinone diacetate (21 g., 0.09 mole), oxy-4,4'-diphenylene diacetate (2.86 g., 0.01 mole), and bis(4-carboxyphenyl)ether (25.8 g., 0.10 mole). These reactants, under argon, are heated and stirred at 276°-282° C for 75 min.; the by-product acetic acid is removed. The argon flow is halted and the reaction mixture is heated at 282° C for 20 minutes under a reduced pressure of about 0.4 mm. Hg. There is obtained 33 g. of copolymer. This material is polymerized further as in Example 2 to give a copolymer with ηinh = 0.78. The copolymer flows at 316° C and exhibits optical anisotropy above that temperature (TOT).

A sample of this copolymer is extruded smoothly into air through a 5-hole spinneret (hole diameter = 0.018 cm.; melt zone temperature is 325° C.; spinneret temperature is 350° C.; pack contains these screens (no./mesh): 6/50, 10/200, 5/325) and wound up as lustrous fibers at 366 m./min. The as-spun fibers exhibit T/E/Mi = 4.7/9.0/97; O.A. = 35° (19.2°). A sample of the as-spun fiber is heated as in Example 2 under these successive conditions: 1 hr./300° C., 1 hr./315° C., 1 hr./325° C., and 1 hr./330° C. The fiber thus obtained exhibits T/E/Mi/Den. = 13.6/11.0/102.4/10.4; O.A. = 11° (17.4°).

EXAMPLE 4

This example illustrates the synthesis of copoly(-chloro-1,4-phenylene 4,4'-oxydibenzoate/terephthalate) (80/20). Fibers having as-spun orientation are obtained from an anisotropic melt of this copolymer.

Combined in a reaction vessel as described in Example 1 are chlorohydroquinone diacetate (48.0 g., 0.21 mole), bis(4-carboxyphenyl)ether (41.3 g., 0.16 mole), and terephthalic acid (6.7 g., 0.04 mole). These ingredients, under nitrogen, are first heated at 275°-305° C. for 8 minutes, after which they are heated and stirred within 293°-318° C. for about 72 min.; the by-product acetic acid is collected. The nitrogen flow is halted, the reaction mixture heated within 318°-320° C. for 11 min. and the pressure reduced to 52 mm. Hg; then nitrogen is added in 2 minutes to return the reaction to atmospheric pressure. The product is ground up and extracted at room temperature with acetone for 18 hr., then with refluxing acetone for 2 hr. The yield of copolymer is 64 g., ηinh = 0.78, flow temperature is 306° C and the copolymer exhibits optical anisotropy above that temperature (TOT).

A sample of this copolymer is extruded into air through a 5-hole spinneret (hole diameter is 0.023 cm., melt-zone temperature is 300° C., spinneret temperature is 320° C., pack contains these screens (no./mesh): 6/50, 10/200, 3/325) and wound up at 259 m./min. The as-extruded fibers are plied about 8X to give a yarn with T/E/Mi/Den. = 3.1/2.5/200/123; O.A. = 14° (20.1°). A sample of the as-spun fiber is heated (oven) as in Example 2 under these conditions: (1) from room temperature to about 160° C. over 30 min. and kept at 160° C. for 30 min., (2) from 160° to about 205° C. over 60 min., (3) from 205°-225° C. over 20 min. and kept at 225° C. for 55 min., and (4) from 225° to about 270° C. for about 20 min. and kept at 270° C. for about 40 min. After a portion of this yarn is heated further, under nitrogen (3.5 standard ft.$^3$/min.), in an oven at 280° C. for 90 min., the yarn exhibits T/E/Mi/Den. = 10.4/3.6/260/122.

EXAMPLE 5

This example illustrates the preparation of copoly(-chloro-1,4-phenylene 4,4'-oxydibenzoate/hexahydroterephthalate) (80/20). An anisotropic melt of this copolymer is readily spun into fibers.

In a 1 l. resin kettle equipped as in Example 1 are placed chlorohydroquinone diacetate (196.6 g., 0.86 mole), bis(4-carboxyphenyl) ether (165.3 g., 0.64 mole), and trans-hexahydroterephthalic acid (27.5 g., 0.16 mole). These reactants are heated, under nitrogen, at 300° C. for 25 minutes, after which they are stirred for 82 minutes while the reaction temperature rises to 320° C. The nitrogen flow is halted and the reaction mixture heated at 320° C. for about 42 minutes under a reduced pressure within the range of 52-198 mm. Hg. There is obtained 267 g. of copolymer, ηinh = 0.76, which flows at 305° C. and exhibits optical anisotropy above that temperature (TOT).

A portion of this copolymer is extruded into air through a 10-hole spinneret (hole diameter is 0.023 cm., melt zone temperature range is 301°-305° C., spinneret temperature is 320° C., pack contains two 50-mesh screens, one 325-mesh screen, and a layer of finely powdered stainless steel) and wound up at 750 m./min. This yarn exhibits T/E/Mi/Den. = 2.5/3.1/148/33; O.A. = 34° (19°).

Yarn prepared in an equivalent manner is plied 25-30X to 805 denier. A portion of this yarn is wrapped on a Fiberfrax-covered cylinder and heated, under nitrogen, in an oven under these successive conditions: 250° C./1 hr., 260° C./1 hr., and 270° C./1 hr. and cooled to room temperature after each heating period. The yarn exhibits T/E/Mi = 14.6/5.9/142.

What is claimed is:

1. A fiber-forming melt spinnable polyester capable of forming an anisotropic melt and consisting essentially of units of the formula:

$$-O-A-O- \quad \text{I}$$

and

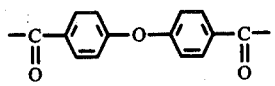

II wherein A is selected from the group of chloro-, bromo-, methyl- and dimethyl-1,4-phenylene radicals; up to 20 mol % of formula I units may be replaced with —O—X—O— units where X is selected from the group of 1,4-phenylene, ethyl-, tertiary butyl- and dichloro-1,4-phenylene, 4,4'-biphenylene, oxybis(1,4-phenylene), thiobis(1,4-phenylene), 3,3',5,5'-tetrachloro-4,4'-biphenylene and 3,3',5,5'-tetramethyl-4,4'-biphenylene and up to 20 mol % of formula II units may be replaced with

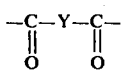

units where Y is selected from the group of 1,3-phenylene, 1,4-phenylene, chloro-, bromo-, and methyl-1,4-phenylene, 1,4-cyclohexylene, 2,6-naphthylene, 4,4'-biphenylene, and ethylenedioxybis(1,4-phenylene) with the proviso that no more than 10 mol % of the total of formula I, formula II, —O—X—O— and

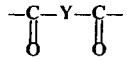

units are replaced.

2. The polymer of claim 1 wherein A is a chloro-1,4-phenylene radical.

3. An anisotropic melt of the polyester of claim 1.

4. A shaped article of the polyester of claim 1.

5. A fiber of the polyester of claim 1.

6. A fiber of the polyester of claim 2.

7. A film of the polyester of claim 1.

8. Fiber-forming copoly(chloro-1,4-phenylene/4,4'-oxydiphenylene 4,4'-oxydibenzoate) (90/10) acccording to claim 1.

9. Fiber-forming copoly(chloro-1,4-phenylene 4,4'-oxydibenzoate/terephthalate)(80/20) according to claim 1.

10. Fiber-forming copoly(chloro-1,4-phenylene 4,4'-oxydibenzoate/hexahydroterephthalate)(80/20) according to claim 1.

11. Fiber-forming poly(chloro-1,4-phenylene 4,4'-oxydibenzoate) according to claim 1.

12. An as-spun fiber of the polymer of claim 11 having a tenacity in the range of about 1–5 gpd, an initial modulus in excess of 100 gpd, and an X-ray orientation angle of less than about 35°.

* * * * *